US005659481A

United States Patent [19]

Qutub et al.

[11] Patent Number: 5,659,481

[45] Date of Patent: Aug. 19, 1997

[54] DYNAMIC INSERTION SYSTEM AND METHOD FOR INCLUDING SELECTED ENCLOSURES/INSERTS IN MAILED STATEMENTS

[75] Inventors: Motaz Qutub; Daniel M. Saldana, both of Rancho Cordova; Robert Fehringer, Camino; Steven L. Mulkey, Cameron Park; William L. Hines, Sacramento; Marc J. Fagan, Davis; Jonathan D. Emigh, Somerset; Frank W. Delfer, Loomis; Lino E. Carnesecca, Lincoln; George E. Rader, Folsom, all of Calif.

[73] Assignee: International Billing Services, Inc., Rancho Cordova, Calif.

[21] Appl. No.: 652,844

[22] Filed: May 23, 1996

Related U.S. Application Data

[63] Continuation of Ser. No. 382,275, Feb. 1, 1995, abandoned.

[51] Int. Cl.[6] .................. G06F 19/00

[52] U.S. Cl. .................. 364/478.08; 364/478.01; 364/478.07; 235/375

[58] Field of Search .................. 364/471.01, 471.02, 364/478.01, 478.08, 478.06, 478.07, 478.11, 478.12, 478.13, 478.14, 478.15, 468.01–468.05; 235/375; 53/493, 494, 500, 501; 209/592, 583, 584, 900

[56] References Cited

U.S. PATENT DOCUMENTS 4,585,220 4/1986 Zemke et al. .................. 364/478.08
4,733,856 3/1988 Gunther, Jr. .
4,797,830 1/1989 Baggarly et al. .
4,800,504 1/1989 Durst, Jr. et al. .
4,800,505 1/1989 Axelrod et al. .
4,817,042 3/1989 Pintsov .
4,852,013 7/1989 Durst, Jr. et al. .
4,862,386 8/1989 Axelrod et al. .
4,930,086 5/1990 Fukasawa .
5,067,088 11/1991 Schneiderhan .
5,083,281 1/1992 Rabindran et al. .
5,142,482 8/1992 Sansone .................. 364/478
5,220,770 6/1993 Szewczyk et al. .
5,245,545 9/1993 Taylor .................. 364/478
5,321,624 6/1994 Helfflrich et al. .................. 364/478

*Primary Examiner*—Reba I. Elmore
*Assistant Examiner*—Thomas E. Brown
*Attorney, Agent, or Firm*—James M. Ritchey

[57] ABSTRACT

A system and method for dynamic insertion of selected inserts into statements to be mailed in which post processing mail data, including selective insert parameters, are developed into a record for mail items and communicated directly to an integrated system controller, which then directs selective insertion of enclosures. The system comprises a mail item preparation apparatus interfaced with a data processor, an inserter apparatus, and an integrated system controller interfaced with the data processor and the inserter. The mail preparing apparatus generally includes a printer, and is mechanically interfaced with the inserter for transfer of mail items. The integrated system controller directs the inserter to selectively include inserts with the mail items according to insert parameter data received from the data processor.

12 Claims, 3 Drawing Sheets

DYNAMIC INSERTION SYSTEM AND METHOD FOR INCLUDING SELECTED ENCLOSURES/INSERTS IN MAILED STATEMENTS

CROSS-REFERENCE TO RELATED APPLICATIONS

This is a continuation of application Ser. No. 08/382,275 filed on Feb. 1, 1995 now abandoned.

BACKGROUND OF THE INVENTION

1. Field of the Invention

This invention pertains generally to insertion systems for filling enclosures to be mailed together with enclosed billing statements and the lo like, and more particularly to a dynamic insertion system and method wherein an integrated system controller monitors movement of statements relative to a plurality of insert feeders, and feeds in to the statements selected inserts according to stored insert data.

2. Description of the Related Art

High volume mailing or mass-mailing is increasing due to increased use of credit purchases, which requires periodic mailing of billing and account statements. Mailed advertising also has given rise to mass mailing. This bulk mailing generally involves several enclosures or inserts which are mailed to recipients. One or more of the enclosures or inserts is generally common to the mail items sent to each recipient, while additional or variable inserts may be included for certain recipients. These variable inserts may be sent to select recipients who use a different credit or financial services or who request different accounting information than other recipients. Such individualized selection of inserts for inclusion with mail items would be very time- and labor-intensive if carried out by hand, and as a result several systems and methods for including selective inserts in mass mailings have been disclosed.

For example, U.S. Pat. No. 5,220,770 discloses a selective outer envelope inserting system which includes a multiple station inserter and a multiple outer envelope collator. An insert hopper contains control pieces with machine-readable codes which are scanned by a scanner. The scanner interfaces with a microprocessor which controls a plurality of additional hoppers, and selects various combinations of inserts to be included in an envelope. The microprocessor is also interfaced with the envelope collator and directs selective envelopes to be inserted from different envelop hoppers.

U.S. Pat. No. 5,083,281 relates an insertion machine with speed optimization wherein a speed optimization circuit includes a microcontroller which determines whether the insert machine cycling speed should be changed. The microcontroller signals a speed adjustment servomechanism which automatically changes machine cycling speed.

U.S. Pat. No. 5,067,088 describes an apparatus and method for assembling mass mail items wherein a matching system has video cameras which sense sequence indicators on envelopes and create signals which are digitally processed. A controller receives the digitized signals and determines from them whether inserts match or correspond to the indicators.

Disclosed in U.S. Pat. No. 4,930,086 is a method and apparatus for sequential product processing with limited bar code reading, in which codes included on intermediary products are read and recorded before each process step. Processing information for each processing unit is recorded, and the next processing unit, based on the codes and processing information, is selected.

U.S. Pat. No. 4,862,386 discloses an apparatus for preparing a letter in which a computer receives signaled letter data as formatted information. The computer reformats and selects data, and directs a printer to print material corresponding to the data.

U.S. Pat. No. 4,852,013 relates a stationary item processing apparatus in which stationary items include encoded information. A feeding structure with a code sensor is controlled by a computer. Codes sensed by the feeding structure are compared to data stored by the computer, which then directs the feeding structure to feed the stationary item into a first feed path to a printing structure, or into a second feed path from the first feed path, depending on the codes.

U.S. Pat. No. 4,817,042 describes an insertion machine with prioritized selection of inserts wherein a processor selectively activates document and enclosure feeders along a transport deck, feeding enclosures based on weight in order to include the maximum weight allowed in a postage category.

Related in U.S. Pat. No. 4,800,505 is a mail preparation system having a data base system which stores insert parameters and codes for items to be mailed. Items to be mailed are marked with identification codes from the data base. A preparing apparatus prepares items to be mailed according to the stored parameters. A detector reads codes on the marked items and a control system responds to codes received by the detector by directing an inserter system to include inserts based on the corresponding insert parameters in the data base.

U.S. Pat. No. 4,800,504 discloses an interactive outgoing and incoming mailpiece processing system in which outgoing mailpieces including identity-encoded returnable stationary item are processed. A computer having a data listing for the identity codes which correspond to operations, causes the processing system to implement the operations indicated by the codes. The incoming mail or return mail is also processed, with the identity codes sensed, and required changes made to the computer data listing.

Disclosed in U.S. Pat. No. 4,797,830 is an insertion machine with postage categorization and selective merchandising having insert feed stations along a conveyor. A first insert station feeds a master control document including indicia onto a conveyor. The indicia thereon indicate and authorize selected downstream insert stations to feed inserts to the master document. Weights are monitored to determine appropriate postal category, and additional inserts may be excluded if the weight exceeds the postal category.

U.S. Pat. No. 4,571,925, describes an insertion machine with postage categorization which uses coded identification on statements. A detector scans the codes on the statements and transfers the coded information to a inserter controller system, which uses the coded information to assemble selected inserts with the billing statements. Assembled inserts are then inserted into envelopes which are transferred through a postage meter.

As can be seen therefore, a variety of selective insert systems for high volume mailings are known. However, the aforementioned systems and devices rely on machine-readable indicia printed on controlling documents to direct selective insert feeding, and thus the insertion machine cycle speed is limited by the speed of the scanning cycle. Time and efficiency are also lost due to the additional step of printing machine readable indicia on items to be mailed.

A particularly undesirable aspect of machine readable indicia on mailed items and statements is the impersonalized appearance due to the presence of bar codes, dash codes, alpha numeric sequences and like coding, which detracts from the aesthetics of the mailed items and reduces advertising effectiveness and customer satisfaction. Additionally, the space occupied by the coding is not available for more useful purposes, adding to the overall cost of the mailing.

A further deficiency in the existing art is reduced reliability due to misreading of codes by detection systems, which results in insert mismatching and mailing of incorrect enclosures to recipients. The misreading may be due to poor print quality of the codes, dirt or scuff-marks which partially cover the codes, or dirty or damaged detection optics. Such insert mismatches causes embarrassment, requires additional mailing to correct the error, and can result in customer loss.

Thus, there is a need for a dynamic insertion system for including selected inserts in mailed statements which does not require use of machine readable indicia, which is faster, and which has increased reliability. The subject invention satisfies these needs, as well as others, and generally overcomes the deficiencies found in currently available systems.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide a dynamic insertion system and method for including selected inserts in mailed statements which does not require the printing and scanning of machine-readable indicia on items to be mailed.

Another object of the present invention is to provide a dynamic insertion system and method for including selected inserts in mailed statements which operates at high speeds.

A further object of the present invention is to provide a dynamic insertion system and method for including selected inserts in mailed statements in which the mailed items are aesthetically pleasant.

Yet another object of the present invention is to provide a dynamic insertion system and method for including selected inserts in mailed statements which is reliable and avoids mismatch of inserts.

Disclosed are a system and method for dynamic insertion of selected inserts into statements to be mailed in which post processing mail data, including selective insert parameters, are developed into a data record for mail items and communicated directly to an integrated system controller, which then directs selective insertion of enclosures.

Specifically, the system comprises means for preparing mail items, data processing means interfaced with the mail item preparing means, an inserter apparatus having a plurality of insert feeding means, and an integrated system controller interfaced with the data processing means and the inserter apparatus. By way of example and not of limitation, the mail item preparing means generally includes printing means and means for mechanically interfacing the inserter apparatus. The integrated system controller is interfaced with the inserter and directs the insert feeding means to selectively include inserts with the mail items according to stored insert parameter data.

The method of using the present invention generally involves receiving and processing the data for a particular mailing, and developing and storing a record for each mail item. Post processing information is added to this record, including selective insert parameters detailing selective inserts to be included with each mail item. This combined data record is then communicated to the integrated system controller via a network link or other interfacing means. The inserts are placed in feeding means such as insert hoppers, and the system operator enters the insert hopper configuration into the system controller. The mail items are conveyed by the hoppers by suitable means. When the mail items reach the insert hoppers, the system controller searches the data record for the selective insert parameters for each mail item. If a particular insert is required for a mail item according to these parameters, a signal is communicated to the insert hopper by the system controller, activating the hopper and feeding the insert into the mail item.

Since there is no scanning of machine readable codes involved in the matching of selected inserts for each mail item, the insert machine cycle speed is not limited by the speed of scanning detection device cycles. The additional step of printing machine readable indicia on the mail items for scanning and matching has been eliminated. Reliability is enhanced because the danger of insert mismatch from code misreading is eliminated. Identical inserts may be included in more than one insert hopper, with the system controller directing the system controller to switch hoppers when inserts run out, thus eliminating the need for system shutdown to replace inserts depleted from a single hopper.

Other objects, advantages, and novel features of the present invention will become apparent from the detailed description of the preferred embodiment which follows, when considered in conjunction with the associated drawings.

DETAILED DESCRIPTION Of THE PREFERRED EMBODIMENT

Figure 1:
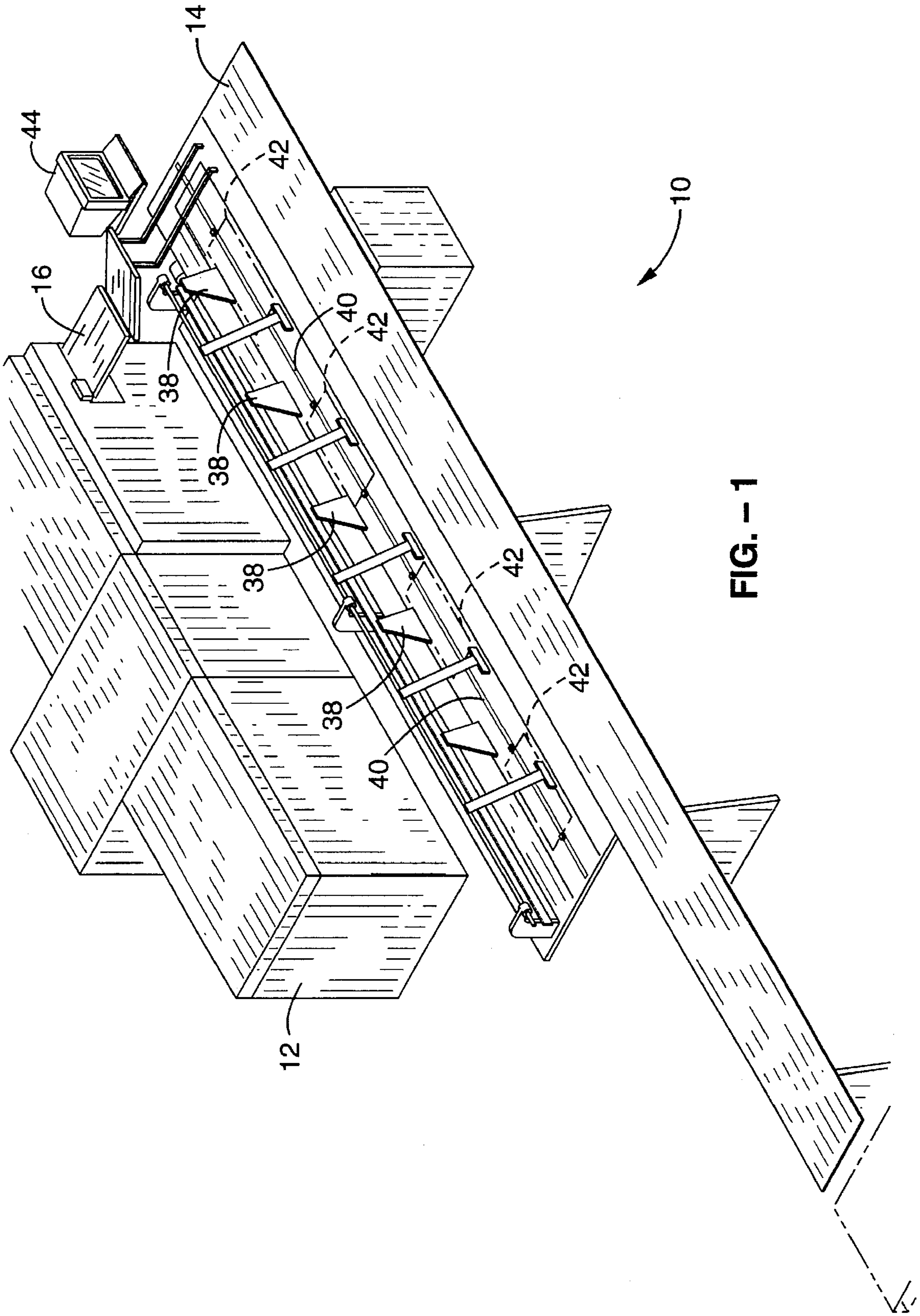
FIG. 1 is a perspective view of a typical mail inserter apparatus employing the subject invention.
Figure 2:
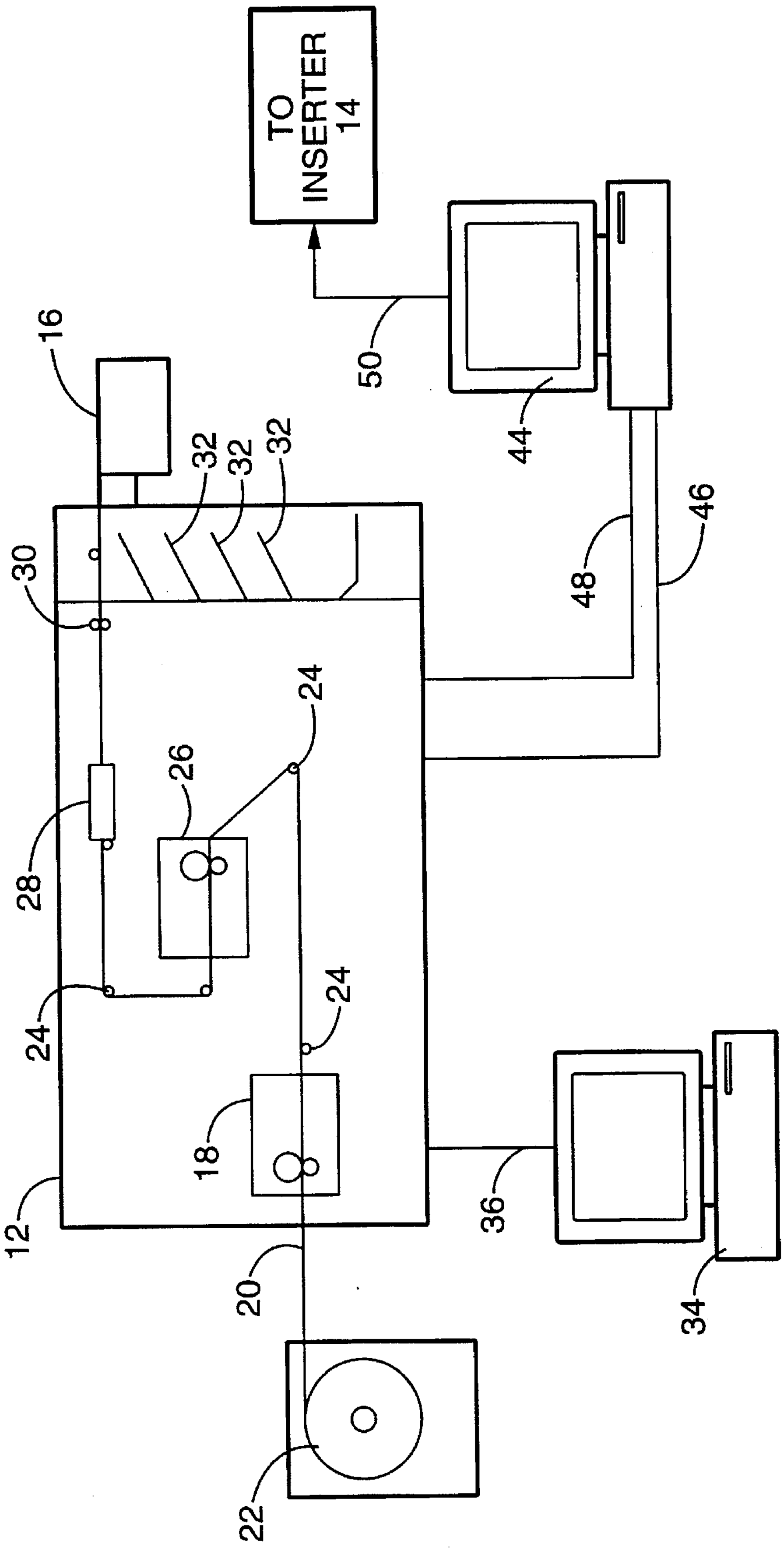
FIG. 2 is a plan view of a typical mail item preparation system employing the subject invention.

Referring now to FIG. 1 and FIG. 2, for illustrative purposes there is shown a preferred embodiment of a dynamic insertion system 10 for including selected inserts in mailed statements. The subject invention generally includes means for preparing mail items, preferably in the form of a mail item preparation apparatus 12. The invention also includes an inserter apparatus 14 which has means for mechanically interfacing to mail preparation apparatus 12. The mechanical interface means preferably includes mail item transferring means in the form of a transfer tray or folder 16.

Referring more specifically to FIG. 2, the mail item preparation apparatus 12 includes means for printing mail items, preferably in the form of, but not limited to, a large capacity, high speed printer, but any printer can be utilized with the subject information processing method. The printer 12 is comprised of one (a simplex printing machine that prints on one side of incoming paper 20), two (a duplex printing machine that prints on both sides of incoming paper 20, which is specifically shown in FIG. 2 as having two print engines 18 and 26), or more print engines. In the shown duplex printer example, a first print engine 18, printing on one surface of the incoming paper 20, receives the paper 20 in a continuous form from an unwinder 22. Although FIG. 2 depicts a paper feeding means that is a spooled system, any paper delivery means is contemplated to be within the realm of this disclosure such as, but not limited to, single sheet providing procedures. Paper 20 is moved through preparation system 12 by suitable actuation means generally used in the art. Paper 20 is directionally oriented within preparation system 12 by a plurality of turnbars 24. As shown, a second print engine 26, printing on the other surface of the incoming paper 20, is included to produce the duplex printing ability. Paper 20, including printed mail items thereon, is directed by turnbars 24 (or other suitable means) from print engines 18 and 26 to separating means such as separator or burster 28, wherein the continuous paper is separated in to individual mail items which are generally fed through directing rollers 30 or other directing means to transfer tray 16. The transfer tray 16, or equivalent means, directs the mail items to an inserter 14, as directed by a system controller computer means 44, discussed further below. Means for organizing mail items, such as storage and collating trays 32 may be included, so that individual mail items could be directed towards trays 32 and organized for later use.

The aforementioned description of a mail preparation apparatus is merely an illustration of a presently preferred embodiment. Other mail item preparation means are also contemplated for use with the present invention. One example of a commercially available document preparation apparatus which can be interfaced with an inserter apparatus for use with the subject invention is the DELPHAX SYSTEMS 3001E printer and post-processing system interface.

The overall mail item preparation apparatus 12 is driven by suitable data processing means, preferably in the form of a microprocessor or personal computer 34, connected to the apparatus 12 by interfacing means for communication, shown here as data communication interface 36. Computer 34 generally includes standard data input means, such as keyboard, floppy disk drives, and interface cables, as well as data storage means and data display means. Computer 34 may be proximate to mail preparation apparatus 12, or located in a separate computer room to isolate the operator from noise associated with mail item preparation.

Referring more particularly to FIG. 1, the inserter apparatus 14 is of generally longitudinal shape so that a plurality of insert feeding means, preferably in the form of vacuum-actuated insert feeders or hoppers 38, are located along the length of inserter 14. Conveying means for mail items is shown here as conveyor path 40. Mail items are received by conveyor path 40 from transfer tray 16 by suitable means commonly used in the art. Mail items 42 are translated along conveyor path 40 past each insert hopper 38.

Inserter 14 is driven by integrated system controlling means, preferably in the form of integrated system controller computer 44. Interfacing communication means, preferably in the form of network linking means such as ethernet interface 46 and parallel interface 48 provide data communication from the mail preparation apparatus 12 and computer 34 to system controller computer 44. Interfacing communication means, shown here as communication interface 50 (various standard types are suitable), allows control instructions from system controller computer 44 to be directed to inserter 14 apparatus and insert hoppers 38. Controller computer 44 generally includes data processing means, and means for inputting configuration data for the insert hoppers. Data input means may be by keyboard, floppy disk, or by interfacing link to another data processing device. The system control computer 44 generally includes means for monitoring the position and movement of mail items along inserter apparatus 14 relative to insert hoppers 38. The monitoring means is typically in the form of one or more photocell detectors or other equivalent position detecting means, which note the presence or absence of mail items at particular locations on the inserter 14.

Figure 3:
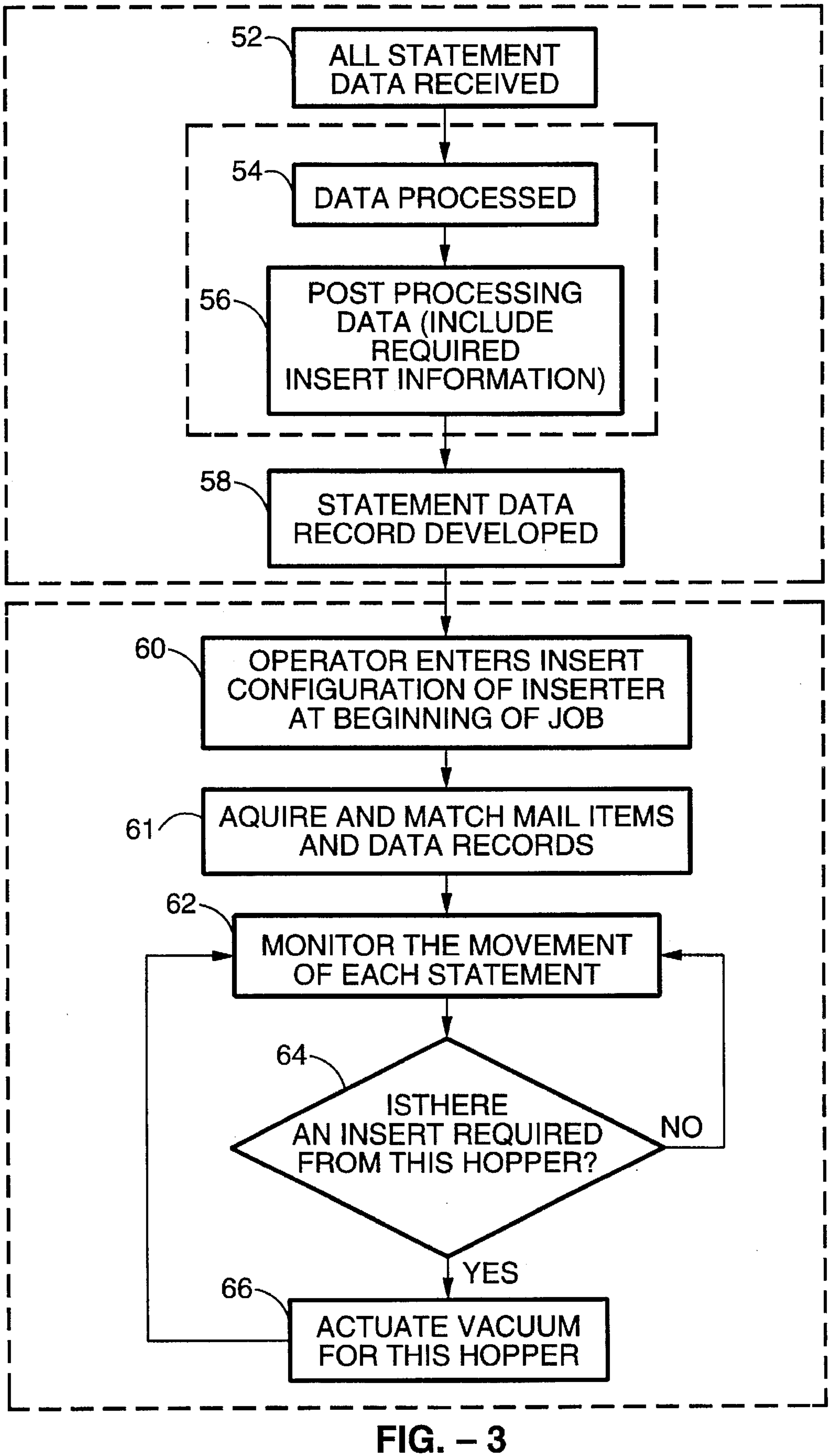
FIG. 3 is a flow diagram of information generally utilized in the subject invention.

For clarity of the subject dynamic insertion process, a controlling flow diagram is generally depicted in FIG. 3. The flow diagram in FIG. 3 is for exemplary purposes, and not intended as a limitation on the present invention. A bulk mailer generally receives 52 mailing data for high-volume mailing jobs from clients who mail monthly billing statements, account information, mass advertising, and the like, to large numbers of mail recipients. An operator for the bulk mailer processes 54 the mailing data, generally preparing a strategy for the bulk mailing job according to the client's instructions. The operator includes 56 post processing data with the processed mail data, the post processing data containing selective insert parameters for individual mail recipients. The operator thus develops 58 a data record for each mail item in the bulk mailing job. This data record identifies, among other things, which inserts will ultimately be included with each mail item. Generally, the aforementioned data is entered upon, processed, and stored by a computer interfaced to the mail item preparation system. However, the data record may be processed and developed on another data processor and transferred later by the system operator to the mail item preparation system Once the mail item data record has been developed and stored, the operator enters 60 the insert hopper configuration parameters into the integrated system controller computer, thus informing the controller computer which insert hoppers include particular inserts.

Following entering 60 of the insert hopper configuration, the insert system comprising the present invention is physically activated to acquire and match the mail items and data records 61, so that the mail preparing apparatus prints, separates, and organizes the mail items for physical transfer to the inserter apparatus. The subject process reliably matches the logical record and the physical mail item before the item is assembled.

As the mail items move along the inserter apparatus past the insert hoppers, the system controller monitors 62 the movement and position of each mail item 42 relative to the insert hoppers. As aforementioned, monitoring 62 is preferably accomplished by a plurality of photocells at select locations.

As the system controller computer monitors 62 the movement of mail items, the system controller tracks 64 the item 42, along with its control record and applies insert data as needed at each insert hopper. This tracking 64 preferably occurs for each insert hopper one machine cycle before the actual mail item 42 arrives in front of the hopper. If the stored insert parameter data does not indicate that a particular insert is to be fed to the mail item from a particular hopper, the monitoring 62 of mail item movement continues, and the mail item moves past the hopper. If, however, the insert parameters require a particular insert to be included with the mail item, an insert hopper actuation step 66 is initiated, wherein an insert is included with the mail item. Actuation of the hopper is generally accomplished by use of vacuum or compressed air. Once the insert has been added, the monitoring 62 of mail item movement and receiving 64 of insert data continues, as the mail items proceed past each of the insert hoppers. Insert hopper actuation 62 occurs at subsequent hoppers according to the insert parameters received 64 by the system controller from the data processor containing the data record. Ultimately, the mail items move past the last insert hopper, and are directed by the system controller on to downstream processes such as envelope insertion and sealing and postage metering (not shown).

Accordingly, a dynamic insertion system and method for inclusion of selective inserts with mail items has been disclosed which allows facile, rapid and reliable inclusion of selected inserts with individualized mail items. The invention has been explained with reference to specific embodiments. Other embodiments, however, of the dynamic insertion system and method comprising the subject invention will be readily apparent to persons skilled in the art upon review of the present specification. Thus, the scope of this invention should be determined by the appended claims and their legal equivalents.

What is claimed is:

1. A dynamic insertion system for including selected inserts with a selected mail item within a containing envelope, comprising:

(a) means for preparing the selected mail item, said preparing means including means for printing the selected mail item;

(b) means for processing data, said data processing means including interfacing means for communicating with said mail item preparing means, said data processing means including means for data storage, said data storage means including a data record, said data record including post-processing data, said post-processing data containing information for inclusion of said selected inserts with the selected mail item within the containing envelope;

(c) an inserter apparatus, said inserter apparatus including a plurality of means for feeding inserts into the containing envelope with the selected mail item, said inserter including means for mechanically interfacing with said mail item preparing means;

(d) integrated means for system control, said control means including interfacing means for communication with said data processing means, said control means including interfacing means for communication with said inserter apparatus; and (e) means for directing inclusion of said selected inserts with the selected mail item within the containing envelope according to said post-processing data obtained from said data record within said data processing means, said directing means associated with said data processing means and said control means.

2. A system as recited in claim 1, wherein said integrated system control means further comprises second means for processing data.

3. A system as recited in claim 1, wherein said integrated system control means further comprises means for monitoring movement and position of said mail items.

4. A system as recited in claim 1, wherein said second data processing means includes means for inputting configuration data for said plurality of insert feeding means.

5. A system as recited in claim 1, wherein said mechanical interfacing means includes means for transferring said mail items from said mail item preparing means to said inserter apparatus.

6. A system as recited in claim 1, wherein said mail preparing means includes means for printing a plurality of said mail items.

7. A system as recited in claim 6, wherein said mail preparing means includes means for separating said plurality of mail items.

8. A system as recited in claim 7, wherein said mail preparing means includes means for organizing said plurality of mail items for said transferring means.

9. A dynamic insertion system for including selected inserts with a selected billing statement within a within a containing envelope, comprising:

(a) means for preparing the selected billing statement, said preparing means including means for printing the selected billing statement, said preparing means including means for organizing items within the containing envelope;

(b) first means for processing data, said first data processing means including means for inputting selective insert parameters, said first data processing means including means for storing said selective insert parameters, said selective insert parameters containing information for inclusion of said selected inserts within the containing envelope with the selected billing statement, said first data processing means including interfacing means for communication with said selected billing statement preparing means;

(c) an inserter apparatus, said inserter including a plurality of means for feeding inserts into the containing envelope, said inserter including means for conveying the containing envelope past said plurality of insert feeding means, said inserter including means for transferring the containing envelope with the selected billing statement and selected inserts from said preparing means to said conveying means;

(d) integrated means for system control, said control means including second means for processing data, said control means including interfacing means for communication with said first data processing means, said control means including interfacing means for communicating with said inserter; and (e) means for directing inclusion of said selected inserts with the selected billing statement within the containing envelope according to said selective insert parameters stored within said first means for processing data, said directing means associated with said first data processing means and said control means.

10. A dynamic insertion system for including selected inserts with a selected billing statement within a within a containing envelope, comprising:

(a) means for preparing the selected billing statement, said preparing means including means for printing a plurality of the selected billing statements, said preparing means including means for separating the selected billing statements, said preparing means including means for organizing items within the containing envelope;

(b) first means for processing data, said first data processing means including means for inputting selective insert parameters, said first data processing means including means for storing said selective insert parameters, said selective insert parameters containing information for inclusion of said selected inserts in the containing envelope with the selected billing statement, said first data processing means including means for displaying data, said first data processing means including interfacing means for communication with said billing selected statement preparing means.

(c) an inserter apparatus, said inserter apparatus including a plurality of insert hoppers, said hoppers each including a plurality of inserts, said inserter including means for conveying the containing envelope past said plurality of insert hoppers, said inserter including means for transferring the containing envelope with the selected billing statement and said selected inserts from said preparing means to said conveying means;

(d) integrated means for system control, said control means including second means for processing data, said second data processing means including means for inputting insert hopper configuration data, said control means including means for monitoring movement and position of said selected inserts, the billing statement, and the containing envelope, said control means including interfacing means for communication with said first data processing means, said control means including interfacing means for communicating with said insert hoppers on said inserter; and (e) means for directing inclusion of said selected inserts into the containing envelope with the selected billing statement according to said selective insert parameters stored within said first means for processing data, said directing means associated with said first data processing means and said control means.

11. A method for dynamic insertion of selected inserts with selected billing statements into containing envelopes to produce mail statements, comprising the steps of:

(a) processing data for a plurality of the mail statements;

(b) providing post processing data for the mail statements, said post processing data including selective insert information required for each of the mail statements;

(c) developing a computer associated data record for each of the mail statements from said data and said post-processing data;

(d) communicating said data record to an integrated system controller, said integrated system controller including means for directing inclusion of selected inserts stored within said computer associated data record into the mail statements according to said data record;

(e) entering into said system controller, by a system operator, insert configurations for a plurality of insert hoppers on an inserter apparatus;

(f) acquiring and matching each of the mail items and said data records;

(g) monitoring, by said system controller, movement and position of the mail statements relative to said plurality of insert hoppers on said inserter apparatus; and (h) actuating said insert hoppers, by said system controller, to selectively provide said inserts to each of the mail statements, according to said data records for each of the mail statements.

12. The method recited in claim 11, further comprising the step of receiving said data for said plurality of mail statements.

* * * * *